(12) United States Patent
Anguille et al.

(10) Patent No.: US 10,137,385 B2
(45) Date of Patent: Nov. 27, 2018

(54) DEVICE FOR EXTRACTION OF POLLUTANTS BY MULTICHANNEL TUBULAR MEMBRANE

(71) Applicants: UNIVERSITE D'AIX-MARSEILLE, Marseilles (FR); CENTRE NATIONAL DE LA RECHERCHE SCIENTIFIQUE, Paris (FR)

(72) Inventors: Stephane Anguille, La Ciotat (FR); Philippe Moulin, Marseilles (FR); Fabrice Testa, Gemenos (FR)

(73) Assignees: UNIVERSITE D'AIX-MARSEILLE, Marseilles (FR); CENTRE NATIONAL DE LA RECHERCHE SCIENTIF, Paris (FR)

( * ) Notice: Subject to any disclaimer, the term of this patent is extended or adjusted under 35 U.S.C. 154(b) by 0 days.

(21) Appl. No.: 15/319,920

(22) PCT Filed: Jun. 25, 2015

(86) PCT No.: PCT/EP2015/064462
§ 371 (c)(1),
(2) Date: Dec. 19, 2016

(87) PCT Pub. No.: WO2015/197797
PCT Pub. Date: Dec. 30, 2015

(65) Prior Publication Data
US 2017/0128856 A1    May 11, 2017

(30) Foreign Application Priority Data

Jun. 25, 2014  (EP) .................................... 14306002

(51) Int. Cl.
*B01D 53/22* (2006.01)
*B01D 11/04* (2006.01)
(Continued)

(52) U.S. Cl.
CPC ...... *B01D 11/0415* (2013.01); *B01D 53/1425* (2013.01); *B01D 53/1493* (2013.01);
(Continued)

(58) Field of Classification Search
CPC ........ B01D 53/228; B01D 2252/20431; B01D 53/1493; B01D 11/0415; B01D 2325/20;
(Continued)

(56) References Cited

U.S. PATENT DOCUMENTS 3,447,286 A   6/1969  Dounoucos
4,119,408 A   10/1978 Matson
(Continued)

FOREIGN PATENT DOCUMENTS

EP   0194483    9/1986
EP   0311903    4/1989
(Continued)

OTHER PUBLICATIONS

International Search Report for corresponding International PCT application No. PCT/EP2015/064462, dated Aug. 31, 2015.
(Continued)

*Primary Examiner* — Anthony R Shumate
(74) *Attorney, Agent, or Firm* — Hauptman Ham, LLP

(57) ABSTRACT

A device for extraction of pollutants by multichannel tubular membrane containing at least one fluid channel allowing the fluid to go through a feed inlet to an outlet end characterized in that membrane comprises at least an extraction channel filled with molten salt in order to adsorb said pollutants having to be extracted from the said fluid. Advantageously, the membrane is a ceramic membrane. An application is for the treatment of traces of pollutants in a liquid or gaseous fluid. For example, the removal of small pollutants as volatile organic compounds from an aqueous stream in industrial wastewater treatment or other water treatment
(Continued)

applications, or the separation of aromatic compounds form an hydrocarbon feed in petrochemical applications. Another application is in the removal of water traces in products of high added value as pharmaceutical, cosmetic or biocarburant for example.

18 Claims, 1 Drawing Sheet

(51) Int. Cl.
  *C02F 1/26* (2006.01)
  *B01D 53/14* (2006.01)
  *B01D 71/02* (2006.01)
  *B01D 71/68* (2006.01)
  *C02F 1/44* (2006.01)
  *C02F 101/32* (2006.01)
(52) U.S. Cl.
  CPC ......... *B01D 53/228* (2013.01); *B01D 71/025* (2013.01); *B01D 71/68* (2013.01); *C02F 1/26* (2013.01); *B01D 2252/20405* (2013.01); *B01D 2252/20431* (2013.01); *B01D 2252/20436* (2013.01); *B01D 2325/20* (2013.01); *C02F 1/44* (2013.01); *C02F 2101/322* (2013.01)
(58) Field of Classification Search
  CPC ...... B01D 2252/20436; B01D 53/1425; B01D 71/68; B01D 2252/20405; B01D 71/025; C02F 1/26; C02F 2101/322
  See application file for complete search history.

(56) References Cited

U.S. PATENT DOCUMENTS

| | | | |
|---|---|---|---|
| 4,617,029 A | 10/1986 | Pez et al. | |
| 4,761,164 A | 8/1988 | Pez et al. | |
| 5,490,884 A | 2/1996 | Robinson et al. | |
| 6,610,546 B1 * | 8/2003 | Liu | G01N 30/96 204/542 |
| 8,110,111 B1 | 2/2012 | Lin et al. | |
| 9,688,536 B2 * | 6/2017 | Zhang | C01B 31/0253 |
| 2006/0207883 A1 * | 9/2006 | Koval | B01D 61/44 204/518 |
| 2009/0189617 A1 * | 7/2009 | Burns | E21B 43/24 324/649 |
| 2010/0258497 A1 * | 10/2010 | Morita | B01D 63/06 210/323.2 |
| 2011/0030383 A1 * | 2/2011 | Ku | B01D 53/228 60/780 |
| 2012/0103904 A1 | 5/2012 | Morita et al. | |
| 2012/0312126 A1 * | 12/2012 | Yamaguchi | B01D 61/246 75/743 |
| 2014/0336479 A1 * | 11/2014 | Ando | A61B 5/4041 600/310 |

FOREIGN PATENT DOCUMENTS

| | | |
|---|---|---|
| EP | 0458598 | 11/1991 |
| WO | 200170626 | 9/2001 |
| WO | 2012074766 | 6/2012 |

OTHER PUBLICATIONS

Hitchens, Lynnann; et al., "VOC removal from water and surfactant solutions by pervaporation: a pilot study, Separation and Purification Technology," vol. 24, Issues 1-2, Jun. 1, 2001, pp. 67-84.
Ulrich, Bridget; et al., "Membrane-assisted VOC removal from aqueous acrylic latex; Journal of Membrane Science," vol. 452, Feb. 15, 2014, pp. 426-432.
Conti-Ramsden, Michael G.; et al., "The combination of adsorbent slurry sorption with adsorbent electrochemical regeneration for VOC removal," Chemical Engineering Journal, vols. 198-199, Aug. 1, 2012, pp. 130-137.
Yang, Chunping; et al., "Performance of biotrickling filters packed with structured or cubic polyurethane sponges for VOC removal," Journal of Environmental Sciences, vol. 23, Issue 8, Aug. 2011, pp. 1325-1333.

* cited by examiner

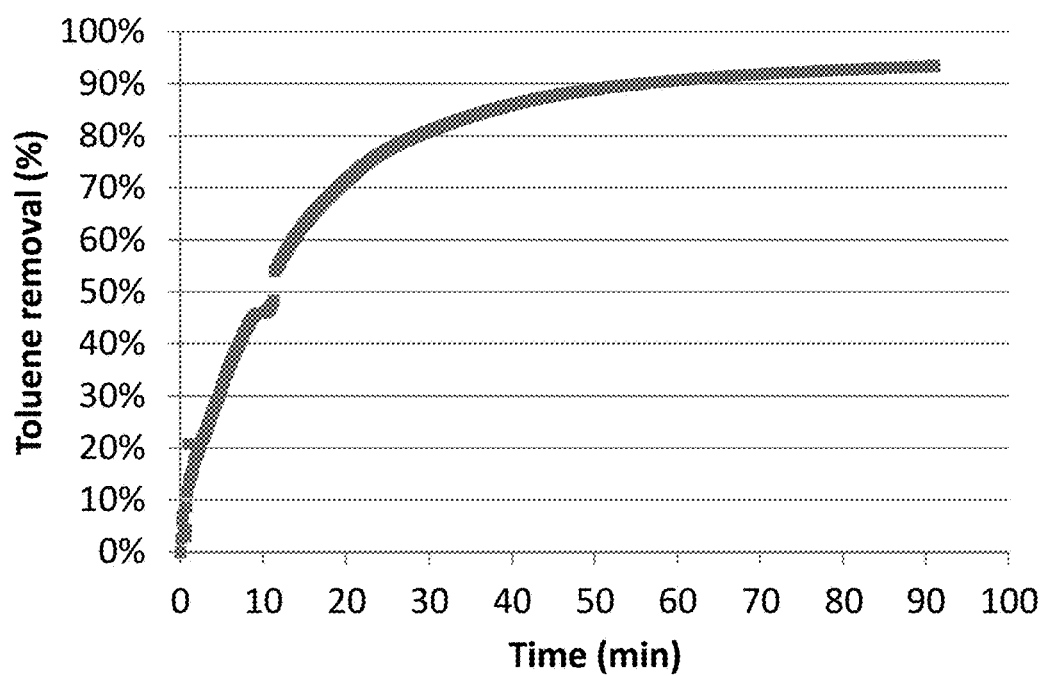

DEVICE FOR EXTRACTION OF POLLUTANTS BY MULTICHANNEL TUBULAR MEMBRANE

TECHNICAL FIELD OF THE INVENTION

The present invention relates to device for extraction of pollutants by multichannel tubular membrane.

The invention will find an application for the treatment of traces of pollutants in a liquid or gaseous fluid. For example, the removal of small pollutants as volatile organic compounds from an aqueous stream in industrial wastewater treatment or other water treatment applications, or the separation of aromatic compounds form an hydrocarbon feed in petrochemical applications. The invention will also find application in the removal of water traces in products of high added value as pharmaceutical, cosmetic or biocarburant for example

STATE OF THE ART

The treatment of organic pollutants traces in aqueous or organic fluid by a porous matrix is a crucial issue for the industry, for the treatment of effluents going out from the factory or even within the production unit.

Some processes already exist as charcoal adsorption but regeneration is especially delicate and not total.

In the case of pervaporation, the membranes contain organic material to improve the solubilization-diffusion phenomena. These membranes are not necessarily well resistant to temperature and chemical conditions of solutions and the permeate flux is very small.

Ceramic membranes can be used to overcome these drawbacks. Ceramic membranes are resistant to temperature and also to aggressive chemical environments (concentrated acids or bases).

To improve on the treatment of fluid, some membranes could contain ionic liquids. Ionic Liquids are inserted into the pores of skin layer of the membranes.

Ionic liquids are known from several years. Ionic liquids have lower volatility and vapor pressure than organic solvent or aqueous solvent. Ionic liquids could be used at much higher temperatures and much lower pressures than volatile organic solvents. Some ionic liquids are liquid salts at room temperature with preferably a melting point lower or equal to 100° C.

The presence of ionic liquids in membranes allows specific separation depending on the ionic liquid selected and the size of the pores . . . .

However, the separation membrane technology as known is not efficient to treat some small pollutants as for instance Volatile Organic Compounds (VOC). In addition, these supported ionic liquid membranes are not easily regenerated. Actually, after a phase of treatment, the efficiency of the membrane decreases by the accumulation of the pollutants on a retentate side. The regeneration requires high temperature, counter pressure and/or back to front flow. These treatments have the drawbacks to damage the ionic liquids, for example, ionic liquids are unhooked from the pores of the membranes. The membranes must be refilled by ionic liquids and the solvent used for the regeneration containing therefore the ionic liquids must be treated. This has the disadvantage of loss of time and significant cost increasing.

Thus the object of the invention is to provide a membrane separation technology enabling specific separation and improvement in the fabrication and regeneration processes.

Other purposes, characteristics and advantages of this invention will become apparent upon examination of the following description and appended drawings. It is understood that other advantages can be included.

SUMMARY OF THE INVENTION

According to one aspect, the invention more particularly relates to a device for pollutant's extraction in a fluid. The device comprises a tubular multichannel membrane wherein at least one channel enables the fluid to go through and at least one channel is filled with molten salt. This channel is dedicated to contain molten salt. The fluid does not run into the channel filled containing molten salt.

The present invention has the advantage to separate small pollutants, as VOC, from a fluid, by the diffusion through the porous matrix of membrane and by the adsorption of pollutant on the molten salt. The pollutant diffuse from the fluid channel to the molten salt placed in a parallel channel.

In addition, the regeneration of the membrane and more particularly of the molten salt is facilitated as the molten salt is in a dedicated channel.

Advantageously, the membrane is in ceramic. The membrane resistance at high temperatures improves the manufacture and the regeneration of device.

The exterior of the membrane is leak-proof in order to avoid permeation. "The permeate" is adsorbed on molten salt and remains on the channel filled by the molten salt, advantageously at least during the extraction step.

According to one embodiment, the channel containing the molten salt is sealed on its extremities in order to keep the molten salt inside. With this embodiment, the molten salt is well contained in its dedicated channel and even during the regenerating time the molten salt would not leak outside. Preferably, the skin layer of the membrane protects the molten salts from others pollutants contained in the fluid as suspended matter, bacteria, etc. . . .

According to another embodiment, the molten salt is going through the channel. The direction of molten salt's movement could be similar or contrary to the direction of the fluid running into the fluid channel. With this embodiment, the molten salt could be continuously regenerated by a specific treatment on the outside of the membrane.

The association of tubular multichannel membrane with molten salt improves the membrane separation technology allowing specific separation and easy manufacture and regeneration.

BRIEF DESCRIPTION OF DRAWING

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 is a graph of Toluene removal percentage in accordance with an embodiment.

DETAILED DESCRIPTION OF THE INVENTION

Advantageous embodiments are now disclosed prior to disclosing a detailed description of an exemplary embodiment of the invention. These embodiments may be taken separately or in combination.

According to one aspect, the invention relates to a device for extraction of pollutants in a fluid comprising at least one multichannel tubular membrane containing at least one fluid channel allowing the fluid to go through a feed inlet to an outlet end characterized in that membrane comprises at least an extraction channel filled with molten salt in order to adsorb said pollutants having to be extracted from the said fluid.

Advantageously, the membrane is a ceramic membrane.

Advantageously, the membrane is mineral, for example $TiO_2$—$ZrO_2$—$Al_2O_3$, or organic, for example polysulfone.

Advantageously, the membrane comprised one extraction channel for one fluid channel.

Advantageously, the membrane is leak-proof on the outside in order to avoid permeation.

Advantageously, the extraction channel is sealed at its extremities.

Advantageously, the molten salt is running into the at least one extraction channel.

Advantageously, molten salt is running forward or reward of the direction of fluid contained in the fluid channel.

Advantageously, the device comprises a catalyst in the extraction channel, for example metallic oxide, organocatalyst or organometallic catalyst.

Advantageously, molten salt is ionic liquid.

Advantageously, the said fluid is a liquid.

Advantageously, the said fluid is a gas.

Advantageously, the channels have a size comprises between 0.5 and 50 mm diameter.

Advantageously, the membrane has pores of a size comprises between 1 nm and 8 µm.

According to another aspect, the invention relates to a system comprising several devices described above.

According to another aspect, the invention relates to a method for extracting of pollutant in a fluid with a device described above characterized in that it comprises:

a first step of extraction wherein the fluid having to be treated goes through the membrane and the pollutant is adsorbed on the molten salt, and a second step of recycling the device wherein the way of said fluid is stopped and the device is heated on the boiling point of the pollutant in order to desorb the pollutant from the molten salt.

Advantageously, the adsorbed pollutant is converted to a less toxic pollutant by catalyst contained in the molten salt.

Advantageously, a gas is running onto the fluid channel during the extraction step.

Advantageously, the fluid channel is maintained under partial vacuum during the extraction step.

According to another aspect, the invention relates to a method for extracting of pollutant in a fluid with a device described above characterized in that it comprises:

a step of extraction wherein the fluid having to be treated goes through the membrane and the pollutant is adsorbed on the molten salt going through the extraction channel, and a step of recycling wherein the molten salt is going through the extraction channel and wherein once outside the membrane, the molten salt is heated on the boiling point of the pollutants in order to desorb the pollutant from the molten salt and wherein the molten salt is then reintroduced in the channel extraction, the steps of extraction and recycling being simultaneous.

The multichannel tubular membrane of the invention is a membrane having several parallel channels. The membrane can be an organic membrane or preferably a ceramic membrane.

The membrane may have several geometric shapes, for example section could be circular, hexagonal, square or triangular. The membrane is comprised between a length of some centimeters and several meters, preferably 0.1 and 2 m length preferably 1 and 2 m length. Several membranes may be placed in series or in parallel.

This membrane has a large surface area allowing good filtration efficiency. It is possible to adapt the hydrodynamic size of the channels depending on the presence of suspended solids in the fluid having to be treated or depending on the viscosity of the fluid that has to be treated.

The channels may have several geometric shapes, for example section could be circular, hexagonal, square or triangular. The size of the channels is comprised between 0.5 and 50 mm, preferably 1 and 6 mm hydraulic diameter. The hydraulic diameter is determined by an equivalent circle.

The term tubular has to be understood as a longitudinal shape having several sections for instance circular or hexagonal . . . .

The device comprises from 1 to 99 membranes.

The membrane comprises from 2 to 52 channels.

The membrane has a section corresponding to a diameter between 10 and 55 mm.

The membrane has a porous matrix. The pores have a size from 1 nm to 8 µm, preferably 1 nm to 10 nm. The porous matrix is covered by a skin layer which has smaller porous structure than the porous matrix. The skin layer determines the cut off of the membrane. Membranes of the invention have cut-offs ranging from nano- to micro-filtration.

The membrane of the invention is multichannel ceramic membrane named monolithic.

Classically, this kind of membrane is used for filtration in a cross flow configuration. For example, wasted water containing suspended matter or organic compounds is pumped through out a membrane filter with high flow rates, under pressure. The membrane allows water and other low molecular weight substances (soaps, salts, and surfactants) to go through the membrane pores and exit the system as permeate. Higher molecular weight substances such as oils and solids are retained by the membrane, called retentate and remain in the wasted water feed.

Accordingly to the invention, at least a channel is filled with molten salt. The channel comprising the molten salt is called extraction channel. The extraction channel does not allow the fluid way through. The channel is dedicated to molten salt. The fluid having to be treated is going through at least another channel of the membrane. This channel is called the fluid channel. The substances having lower molecular weight than the cut off of the membrane go through the membrane's pores and are adsorbed on molten salt due to concentration difference between the extraction channel and the fluid channel.

Preferably, one channel is filled by molten salt for one channel letting the fluid goes through.

In an innovative way, the membrane is leak-proof on its outside. The outside of the membrane is preferably covered by a material preventing the leaking of molecular weight compounds under the cut off of the membrane. Advantageously, a coating proof is deposited on the outer surface of the membrane. For instance, fluoropolymers as PolyVinyliDene Fluoride (PVDF) or Polytetrafluoroethylene (PTFE) may be used. The membrane of the invention does not allow a transversal filtration or permeation as state of the art membranes allow. The membrane of the invention does not enable compounds to exit transversally from the membrane. The membrane does not enable compounds to go transversally through the outer surface.

The outside means the outer surface of the tubular membrane multi-channel. The outer surface is defined by the external boundary or surface or circumference of the tubular membrane.

Leak proof means that the outer surface is fluid proof more specifically gas and liquid proof.

According to one embodiment, the extraction channel is sealed at its extremities in order to maintain the molten salt in the extraction channel.

According to another embodiment, the extraction channel is open at its extremities and the molten salt runs across the channel from part to part.

The molten salt can run on the same direction as the fluid or in a different direction.

Preferably, the molten salt which enters the membrane is always free of pollutant therefore the extraction rate is always maximum with this embodiment.

The invention combines a multichannel ceramic membrane with molten salt.

Molten salt is useful to solubilize organic compounds and metals. In addition, the low vapor tension of molten salt gives the advantage of being an ecofriendly solvent.

Molten salt has to be understood as including ionic liquids. Single or mixture of molten salt could be used.

One advantage of the invention is the wide range of molten salt and membrane which can be used to treat the fluid.

The membrane and the molten salt have to be selected notably depending on the pollutant which has to be extracted and the fluid having to be treated.

The couple the membrane's cut off/molten salt's viscosity must be determined in order to the molten salt does not go through the membrane's pores under the fluid's pressure and temperature.

A first criterion is the melting temperature of the molten salt:
- for membranes with large pores or for processes requiring high temperature: solid molten salt at room temperature and viscous at high temperature should be used, for example quaternary ammonium salt, phosphonium salt, sulfonium salt or halides, imidazolium, pyridinium.
- for membranes with small pores or processes at room temperature: molten salt preferably liquid at room temperature such as the ionic liquids most commonly described in the literature should be used, for example [Bmim][$PF_6$], [Bmim][$PF_4$], [Bmim][$NTf_2$].
- for molten salt circulating in the same way or against the direction of the fluid having to be treated: molten salt liquid at room temperature should be used.
- for processes requiring low temperature as low temperature liquefied gas, the use of acids ionic liquids as ([Bmim]$Br^-AlCl_3$) should be used notably to work at temperatures below 0° C.

A second criterion is the chemical nature of the fluid having to be treated and pollutant having to be adsorbed.
- for aqueous fluids: molten salt is chosen among those having a predominantly hydrophobic character.
- for liquid or gaseous organic fluids: molten salt is chosen among those being hydrophobic or hydrophilic.
- for pollutants of type of aliphatic hydrocarbon, cations (Bmim, Omim . . . ) and/or anions (conjugate bases of fatty acids): molten salt is chosen among those having one or more aliphatic chains to promote hydrophobic interactions.
- in the case of aromatic pollutants (BTEX, HAP . . . ): molten salt is chosen among those having one or more aromatic rings in the cation (Bmim, Bzmim . . . ) and/or in the anion ($TsO^-$ . . . ) in order to promote π-stacking interactions.
- for aprotic polar pollutants (ethers, esters, ketones, halogenated derivatives . . . ): all molten salt with an organic cation and an inorganic or organic anion should be used.
- for protic polar pollutants (alcohols, amines, thiols, carboxylic acid . . . ) molten salt is chosen among those having polar hydrophilic copula (group OH, NH . . . ) in the cation or the anion to promote hydrogen bonds with VOCs to remove.
- in the case of water as pollutant: the molten salt is chosen among those having one or more halides anions, tetrafluoroborate, tosylates, carboxylates, phosphates . . . .

According to one embodiment, the molten salt contains an homogeneous or heterogeneous catalyst. In the case of homogeneous catalyst, the catalyst is immobilized in the molten salt by the use of ionic part. For example the titanium dioxide may be used as heterogeneous catalyst.

This configuration has the advantage that the pollutant which is adsorbed on the molten salt is transformed into degraded compound classically less polluting. For instance, the contaminant $NO_x$ is adsorbed and degraded into $NO_3$.

The tubular multichannel ceramic membrane used by the invention could be found in the main French providers as Tami, CTI or Pall-Exekia.

According to the invention, the method of making the device for extraction advantageously comprises a step of leak-proof on the outside of the membrane.

In the embodiment wherein the molten salt is running into the membrane, the fluid channel is connected to a circuit of the fluid having to be treated and the extraction channel is connected to a circuit of molten salt. The circuit of fluid brings the said fluid to the inlet of the fluid channel and collects the said fluid treated, also called the retentate, at the outlet of the said fluid channel. The circuit of the molten salt brings molten salt to an inlet of the extraction channel and collects molten salt adsorbed with the pollutant to an outlet of the said extraction channel. The inlet of the fluid having to be treated and the inlet of the molten salt may be on the same side of the membrane if both are running in the same way, co-current flow, in contrary if both are running in the opposite way, opposite flow or countercurrent flow, the inlet of the fluid having to be treated and the inlet of the molten salt will be on the opposite side.

In the embodiment wherein the extremities of the channel are sealed, an extremity of the channel is closed for example with glue and the channel is filled with the molten salt by its other extremity. The filling may be carried out at atmospheric pressure or preferably on a slight overpressure in order to avoid the formation of air in the channel. To decrease the viscosity of molten salt, the molten salt and/or the membrane can be heated in order to make the filling easier. When the channel is fully filled the other extremity is closed for example with glue.

One of the advantageous of the present invention is easy recycling step of the device. The recycling enable to remove the pollutant adsorbed on the molten salt in order to give back its full efficiency to the molten salt. In the application, the terms "recycling" and "regenerating" are used equally.

The recycling process comprises the molten salt heating to desorb the pollutant from the molten salt. Preferably the temperature increasing is controlled in order to make sure the viscosity remains sufficient to maintain molten salt in the extraction channel. The temperature should advantageously be above the boiling point of the pollutant adsorbed on the molten salt.

According to one embodiment wherein the extraction channel remains sealed at its extremities and the molten salt contained in the said channel, the membrane is heated leading to the desorption of pollutant from the molten salt, a gas is running in the fluid channel or said channel is maintained under weak partial vacuum. The said channel is connected to a cold trap in order to catch the desorbed pollutant. A similar process will be applied to the device containing catalysts in molten salt.

According to another embodiment, it is possible to open the extraction channel to remove the molten salt and the adsorbed pollutant from the membrane. The removal of the molten salt is performed with a solvent running in the said channel. The solvent and the molten salt are separated by a rotary evaporator. Then the molten salt is heating to desorb the pollutant. The solvent may be used to clean the membrane too. The solvent may be the acetone if the membrane is a ceramic membrane.

In the case of solid molten salt at room temperature, it is preferably heated up to reach the melting point of the molten salt in order to facilitate the device's recycling. For this type of salt having still a high viscosity at their melting point, it is even possible to reduce the pressure so as to facilitate pollutant's evaporation.

In the embodiment wherein the molten salt flows in the forward or reverse direction of the fluid to clean up, the molten salt is recycled in a continuous way. Advantageously, the molten salt is sucked out of the membrane before reaching a vacuum chamber equipped with a condenser. The pollutant is removed from the molten salt. Once the molten salt is cleared of pollutant, a return pump sends back the molten salt in the membrane.

The use of the invention's device comprises the circulation of the fluid having to be treated in the fluid channel. The pollutants contained in the fluid are transported by diffusion to molten salt contained in the extraction channel where they are adsorbed.

As a possibility, the circulation pressure is chosen to compensate the pressure drop in the channel. The temperature is preferably the one of the fluid.

According to an advantageous embodiment, fluid channel is under slight overpressure. This configuration enables to confine molten salt in the extraction channel avoiding leaking of molten salt.

The extraction time is depending on pollutant's concentration having to be eliminated in the fluid. Advantageously, the fluid goes several times through the membrane to reduce the residual concentration to a targeted concentration of the pollutant to extract.

Obviously, the more the molten salt is fully regenerated, the more the diffusion and the adsorption are rapid and significant.

EXAMPLE 1

A gas is treated with a device according to the invention.
The membrane used is a tubular multi-channel ceramic membrane:
Membrane diameter: 25 mm
Membrane Length: 1178 mm
Number of channel: 7 or 19 or 27 or 52 with one channel filled with molten salt for one channel for the going of the gas.

Velocity of the gas way through the fluid channel: 2-6 m/s
Cut off of the membrane: 1 kDa
An effluent is treated with a device according to the invention.

The effluent is an industrial liquid effluent containing a mixture of hydrocarbon.

The pollutants to be extracted are polyaromatic hydrocarbon (PAH) and BTEX.

The concentrations of pollutants in the effluent having to be treated are:

| PAH | μg/L |
|---|---|
| naphthalene | 250 |
| acenaphthylene | 0.61 |
| acenaphthene | 0.95 |
| fluorene | 2.8 |
| phenanthrene | 3.5 |

| BTEX (5 compounds) | μg/L |
|---|---|
| benzene | 4880 |
| toluene | 4100 |
| Ethylbenzene | 510 |
| o-Xylene | 776 |
| m + p-Xylene | 1380 |

The molten salt selected is an ionic liquid $[Bmim][PF_6]$, (butylmethylimidazolium hexafluorophosphate)

The removal of PAH is between 92% and 98% and the removal of BTEX is above 97% for the maximum value.

EXAMPLE 2

A liquid extraction without a membrane is performed to measure VOC capture potential by Ionic Liquids in an aqueous medium.

Water mixtures of VOCs, column A, are produced in concentrations given in column B. The removal of these VOCs is given in column C respectively depending on the concentration range. Column D gives the amount of ionic liquid that must be used to remove 80% of the VOCs present at the highest possible concentration that is to saturation. The stirring time is given for information because no influence is observed in the studied range. The extraction is performed at room temperature. For the butanone, the removal at saturation was not analyzed. Actually, at a concentration of 0.10 the removal is only 64%. The ionic liquid is $[Bmim][PF_6]$.

| A - VOCs | B - Concentration range (% wt) | C - Removal | D - Amount of IL to remove 80% of VOCs at saturation | E - Contact time |
|---|---|---|---|---|
| Benzene | 0.05%-saturation | 83-96% | 40 g Li/g VOC | 5 min-1 h |
| Toluene | 0.01%-saturation | 70-97% | 80 g Li/g VOC | 5 min-1 h |
| Xylene | 0.01%-saturation | 97-99% | 160 g Li/g VOC | 5 min-1 h |
| Butanone | 0.10% | 64% | — | 5 min-1 h |
| Chloroform | 0.01%-saturation | 91-95% | 18 g Li/g VOC | 5 min-1 h |

EXAMPLE 3

For a membrane with 31 channels and a MWCO of 5 kDa is used: one channel on two contains ionic liquids (Total 15 channels). The liquid ionic is [Bmim][PF$_6$], and the total weight is around 150 g (around 10 g/channel). A model gas containing 1000 PPM of a VOC, i.e. toluene, in air is processed through the lumen of the free channels of the membrane. The removal of toluene is determined versus time. It is found that 90% of the removal achieved in 1 hour. The experiment is performed at room temperature.

The result is giving in FIG. 1.

The maximum removal kinetics is 2000 ppm/h with 150 g of ionic liquid. For information, the miscibility of toluene in the ionic liquid [Bmim][PF$_6$] is 23% at 26° C.

EXAMPLE 4

Tests on gas of biogas type have also been made. Preliminary results show that it is possible to perform selective extractions with the type of device of the invention and enhance methane. This type of gas contains mostly methane, carbon dioxide and hydrogen sulfide which is the main obstacle to the recovery of biogas.

The invention combines a membrane with the ionic liquid, i.e. im3008b, is able to extract from a continuous flow of gaseous effluent 0.37 mg of hydrogen sulfide per gram of ionic liquid in 2 h30 while at the same time, the rate of methane extraction is zero.

The use of more hydrophilic ionic liquids such as [Bmim][BF$_4$] or [Bmim][Br] will allow increasing very significantly the rate of extraction of H$_2$S.

CO$_2$, very soluble in ionic liquids of may be extracted quantitatively by incorporating ionic liquids as [Bmim][NTf$_2$] and [Bmim][PF$_6$] having a high affinity for CO$_2$ in the device of the invention.

Thus, the association of specific modules for H$_2$S or CO$_2$, or the filling of the same membrane with different specific ionic liquids for H$_2$S or CO$_2$ in to different extraction channel will enhance the methane from biogas.

The invention claimed is:

1. A device for extraction of pollutants in a fluid, the device comprising at least one multichannel tubular membrane containing two or more fluid channels allowing the fluid to go through a feed inlet to an outlet end wherein the membrane comprises at least one extraction channel and molten salt, the at least one extraction channel and the two or more fluid channels are parallel, the at least one extraction channel being filled with the molten salt configured to adsorb said pollutants having to be extracted from the said fluid by diffusing from the two or more fluid channels to the molten salt placed in the parallel extraction channel.

2. The device according to claim 1, wherein the circumference of the tubular membrane is leak-proof on its outside in order to avoid permeation through the circumference of the tubular membrane.

3. The device according to claim 1, wherein the nature of the membrane is organic or mineral.

4. The device according to claim 1, wherein the membrane is a ceramic membrane.

5. The device according to claim 1, wherein the membrane comprises one extraction channel for one fluid channel.

6. The device according to claim 1, wherein the at least one extraction channel is sealed at its extremities.

7. The device according to claim 1, comprising a circuit of molten salt connected to at least one extraction channel comprising molten salt configured to run along the at least one extraction channel.

8. The device according to claim 7, further comprising a circuit of fluid having to be treated connected to the inlet of at least one fluid channel of the two or more fluid channels, and wherein the circuit of molten salt is connected to an inlet of at least one extraction channel and wherein the inlet of the at least one fluid channel of the two or more fluid channels and the inlet of at least one extraction channel are placed on the same side or on the opposite side of the membrane and configured so that the molten salt is running forward or rearward of the direction of fluid contained in the at least one fluid channel.

9. The device according to claim 1, further comprising a catalyst on the extraction channel.

10. The device according to claim 1, wherein the molten salt is ionic liquid.

11. The device according to claim 1, wherein the said fluid is a liquid or a gas.

12. The device according to claim 1, wherein the more than two fluid channels and at least one extraction channel have a diameter size between 0.5 and 50 mm.

13. The device according to claim 1, wherein the membrane has pores of a size between 1 nm and 8 μm.

14. The system comprising several devices according to claim 1.

15. The method for extracting pollutant in a fluid with a device according to claim 1 wherein:
 a first step of extraction wherein the fluid having to be treated goes through at least two fluid channels of the two or more fluid channels of the membrane and the pollutant is adsorbed on the molten salt, and
 a second step of recycling the device wherein the way of said fluid is stopped and the device is heated on the boiling point of the pollutant in order to desorb the pollutant from the molten salt.

16. A method for extracting pollutant in a fluid with a device according to claim 1, the method comprising:
 a step of extraction wherein the fluid having to be treated goes through at least two fluid channels of the two or more fluid channels of the membrane and the pollutant is adsorbed on the molten salt going through the extraction channel, and
 a step of recycling wherein the molten salt is going through the extraction channel and wherein once outside the membrane, the molten salt is heated on the boiling point of the pollutants in order to desorb the pollutant from the molten salt and wherein the molten salt is then reintroduced in the channel extraction, the steps of extraction and recycling being simultaneous.

17. The device according to claim 1, wherein the total number of fluid channels and extraction channels ranges from 3 to 52.

18. The device according to claim 14, wherein the several devices each comprise from 2 to 99 membranes.

* * * * *